April 19, 1932. A. WEILAND 1,854,239
TUNING DEVICE
Filed June 24, 1930
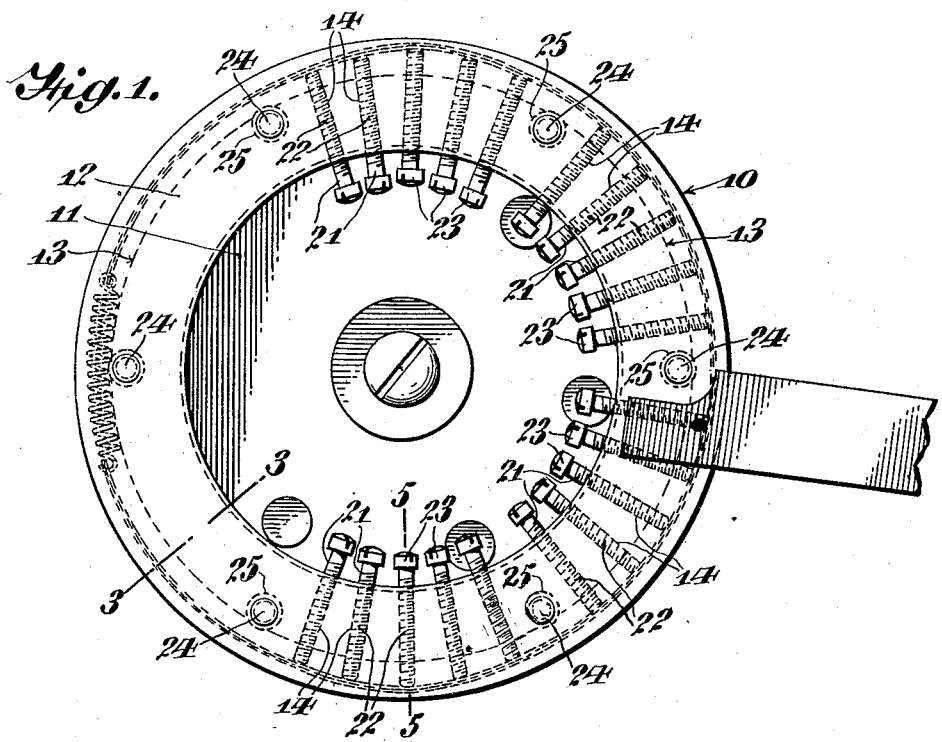
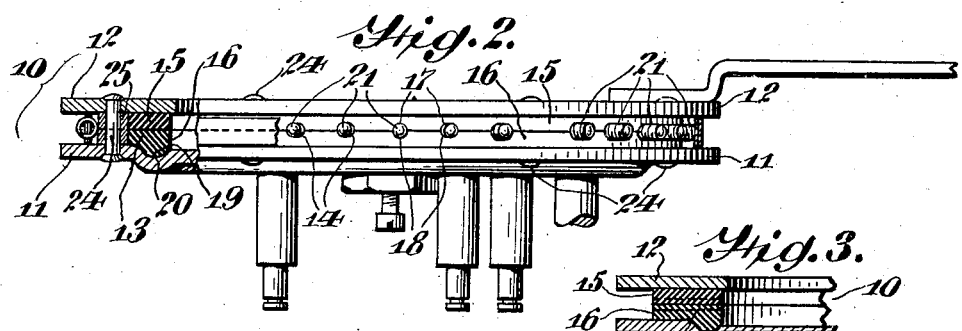
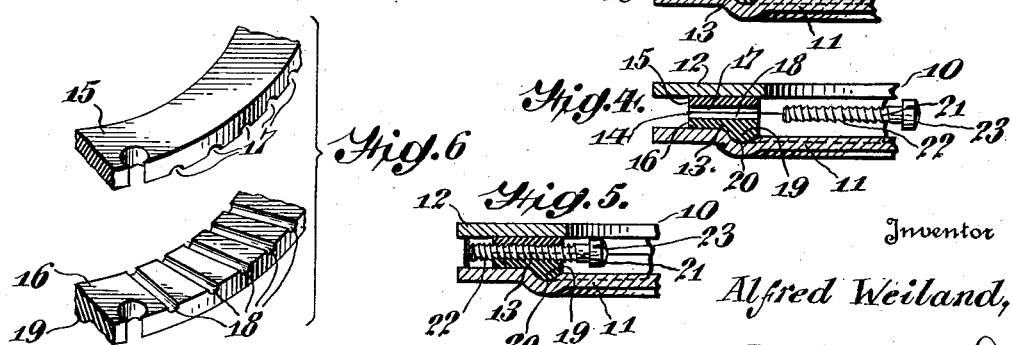
Inventor
Alfred Weiland,
T. R. Goldsborough.
Attorney Patented Apr. 19, 1932

1,854,239

UNITED STATES PATENT OFFICE

ALFRED WEILAND, OF GERMANTOWN, PENNSYLVANIA, ASSIGNOR, BY MESNE ASSIGNMENTS, TO RADIO CORPORATION OF AMERICA, OF NEW YORK, N. Y., A CORPORATION OF DELAWARE

TUNING DEVICE

Application filed June 24, 1930. Serial No. 463,478.

The present invention relates to the combination of a support and members supported thereby and adjustable relatively thereto. The invention is particularly applicable to a control for effecting capacity or tuning variations in a radio hook-up such as is shown in the Elliott Patent 1,707,949, granted April 2, 1929, in which the adjustable members are mounted in apertures formed in the support and where, in addition, a third member is to be affected by the adjustment of the adjustable members.

An object of the invention is to provide an improved connection between a support and members adjustable relatively thereto.

Another object is to provide an improved support for members adjustable relatively thereto.

Still another object is to provide an improved support for members adjustable relatively thereto, which support is simple of construction and assembly and may be simply and cheaply manufactured.

A further object of the invention is to provide a support having unthreaded apertures therethrough, the walls of which are adapted to coact with threads on threaded members for advancement of the latter through the apertures and for holding the same firmly in adjusted position.

A still further object of the invention is to provide a support having apertures therethrough, the walls of which will yield elastically to members projected therethrough, and will hold said members against displacement radially of the apertures under any pressure to which they may normally be subjected.

A still further object of the invention is to provide a support for threaded members, which support may be simply and cheaply constructed with apertures therein adapted to receive the threaded members, and the walls of which apertures are adapted to elastically cooperate with the threads of said members for advancing the same through the apertures of the support.

While having a wide range of application, the principles of the invention have particularly advantageous application to use in connection with rotatable cam wheel constructions, such as are shown in the above mentioned patent, in which there is shown a flexible cam surface mounted peripherally of a rotatable cam wheel, and in which the contour of the said surface may be varied through the instrumentality of a plurality of radially adjustable screws extending through apertures in a peripheral metallic flange.

In the herein illustrated embodiment of my invention, the peripheral flange is formed of yieldable material, as rubber or a rubber composition having radially extending apertures through which are extended adjustable members, as screws, for adjustment of the flexible cam surface.

This peripheral flange is preferably constructed of a pair of flat, annular, elastic members held tightly together by a metallic cam wheel disc and a metallic ring connected through the circular elastic members by rivets or the like. One of the rubber rings may be provided with a ridge lying in a similarly shaped depression in the cam wheel disc for centering purposes, and the two rubber rings may be provided with complementary radial grooves on their adjacent faces; said grooves together providing apertures in the peripheral flange, for reception of the adjustable members.

For a complete understanding of the invention reference may be had to the accompanying drawings, in which is illustrated an application of my invention to a construction such as is found in the above cited patent.

In the drawings:

Fig. 1 is a plan view of a cam wheel formed in accordance with the invention.

Fig. 2 is a side elevation thereof with a part in section to show the relation of structural features.

Fig. 3 is a section on line 3—3 Fig. 2 showing the arrangement and construction of the members comprising the marginal flange.

Fig. 4 is a sectional view of a portion of the cam wheel structure of Fig. 1 showing an adjusting screw as removed from its aperture in the flange.

Fig. 5 is a detail similar to Fig. 4 showing the screw assembled with the flange.

Fig. 6 is a perspective view showing both of the members comprising the yieldable elastic flange filler.

Referring now to the drawings in detail, 10 designates a cam wheel comprised of a disc 11 and a member 12, both of rigid material, as metal, between which is held a filler 13 of yieldable material, preferably having a considerable degree of elasticity; the filler having a plurality of apertures 14 formed therein and extending radially therethrough to accommodate adjustable members which will be hereinafter described.

The filler may be made for convenience and economy of manufacture, of a pair of flat members 15 and 16, providing, with the member 12, a flange on a disc 11, all in the present embodiment of annular configuration, the members 15 and 16 having, in their contacting surfaces, complementary grooves 17 and 18 which together form the apertures 14. By forming the flange in this manner, the apertures may be simply and cheaply provided by moulding processes, and the accuracy of position and bore of the apertures is assured without the use of the special mechanism and skill necessary in forming the same by boring.

The members 15 and 16 are preferably made from material having such degree of elasticity that the walls of the apertures 14 will yield under pressure of screws or like members extended therethrough sufficiently to permit of their passage and, at the same time, of sufficient resistive qualities to prevent ready displacement of these members radially to the aperture bores.

A substance having satisfactory qualities may be provided in the nature of a rubber composition having approximately 50% of rubber properly combined and treated as in well-known vulcanizing processes. The composition should have durable qualities and should be capable of lasting for a long period of time without deteriorating or shrinkage. All free sulphur should be eliminated in its preparation, it should be thoroughly cured, and should give a plastometer test of not more than .35 mm. before using.

The assemblage of the rubber rings with the disc may be facilitated by providing one of the rubber rings and the disc with cooperating centering devices which may be in the nature of an interengaging ridge 19 and groove 20, as shown in Fig. 3 of the drawings.

Suitable adjusting members, which, as shown, may be in the nature of screws 21, are threaded as at 22 so as to engage or bite into the walls of the apertures 14, which are sufficiently yielding to permit of and assist the advancement of the screws in their adjustment. The screws are provided with kerfed heads 23 which may be engaged by a screwdriver for making the proper adjustments.

The bores of these apertures need not be threaded, and are preferably of slightly less diameter than that of the screws in order that the latter may be firmly gripped thereby and held against displacement from their positions of adjustment.

The members 11 and 12 are held together by rivets 24 or other suitable means extending therethrough and which may also extend through the rubber rings, as shown. These rivets may be of any suitable number found necessary to hold the parts together and may be conveniently applied at the outer periphery of the rings 15 and 16, as shown.

These rivets are surrounded by suitable spacing sleeves 25 which serve to maintain the members 11 and 12 in proper spaced relation in assembling the said members with the filler so as to protect the filler members against undesirable compression.

While the invention as herein described is applied to a construction such as is shown in the above-named patent, it is to be understood that the principles thereof are applicable to a variety of situations where the adjustment of one member relative to another is desirable. It is believed, also, that this fact will be readily apparent from the application of the invention as herein set forth and that further illustration of the invention is unnecessary. In view of the above remarks, it will be clear that I do not wish to be limited in the scope of my invention except by the state of the art and the terms of the appended claims.

I claim:

1. In combination, a pair of rigid plates, a filler of yielding material held therebetween and having apertures therethrough, and rigid members adjustably supported in said apertures; said filler having a ridge on one surface, and one of said rigid plates having a groove corresponding in shape to the ridge for receiving the ridge and positioning the filler relative to the plate.

2. In combination, a pair of rigid circular members, an annular yielding filler between the members, a ridge on the filler, and a groove on one of the members coacting with the ridge for centering the filler relative to the said member, and means for securing the members and filler together.

3. In combination, a pair of rigid circular plates, an annular rubber filler between the plates, means for centering the filler relative to one of the plates, said filler having apertures radially formed therein and rigid members adjustably extended through said apertures, and means for securing said plates and filler together.

4. A control for radio tuning devices comprising a movable member, a flexible member yieldably mounted on one surface thereof, adjusting members supported by the movable member for varying the form of the flexible member and movable transversely of the movable member, said movable member including an elastically yieldable material having apertures in which the adjusting members are movably mounted.

5. In combination, a pair of yieldable members held in contact with each other and having complementary grooves in their contacting surfaces forming apertures; said apertures being unthreaded, rigid threaded members adjustably mounted in said apertures and having a diameter slightly greater than the apertures, said rigid members being wholly supported by said yieldable members, and rigid mounting means for holding said last named members in contact with each other.

6. In combination, a pair of yieldable members held in contact with each other and having complementary grooves in their contacting surfaces forming apertures, said apertures being unthreaded, rigid threaded members adjustably mounted in said apertures and having a diameter slightly greater than the apertures, said rigid members being wholly supported by said yieldable members, rigid mounting means for holding said last named members in contact with each other, said last named means including a pair of spaced plates between which the yieldable members are clamped, and spacers mounted between said plates to prevent compression of said yieldable members beyond a predetermined limit.

7. A control for radio tuning devices comprising a movable member, a flexible member yieldably mounted on one surface thereof, and adjusting members supported by the movable member for varying the form of the flexible member and movable transversely of the movable member, said movable member including a body of elastically yieldable material having grooves adapted to provide apertures in which the adjusting members are movably mounted.

In testimony whereof I have hereunto subscribed my name this 17th day of June, 1930.

ALFRED WEILAND.